UNITED STATES PATENT OFFICE.

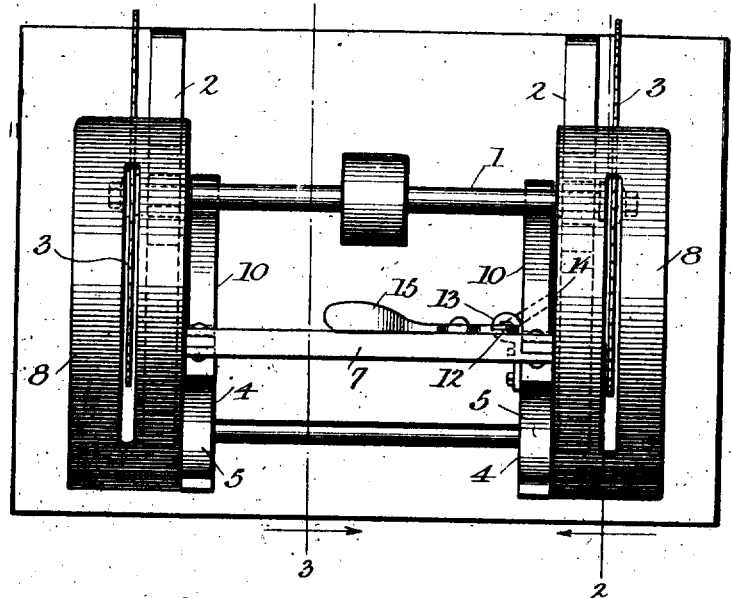
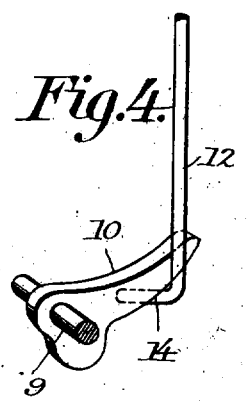
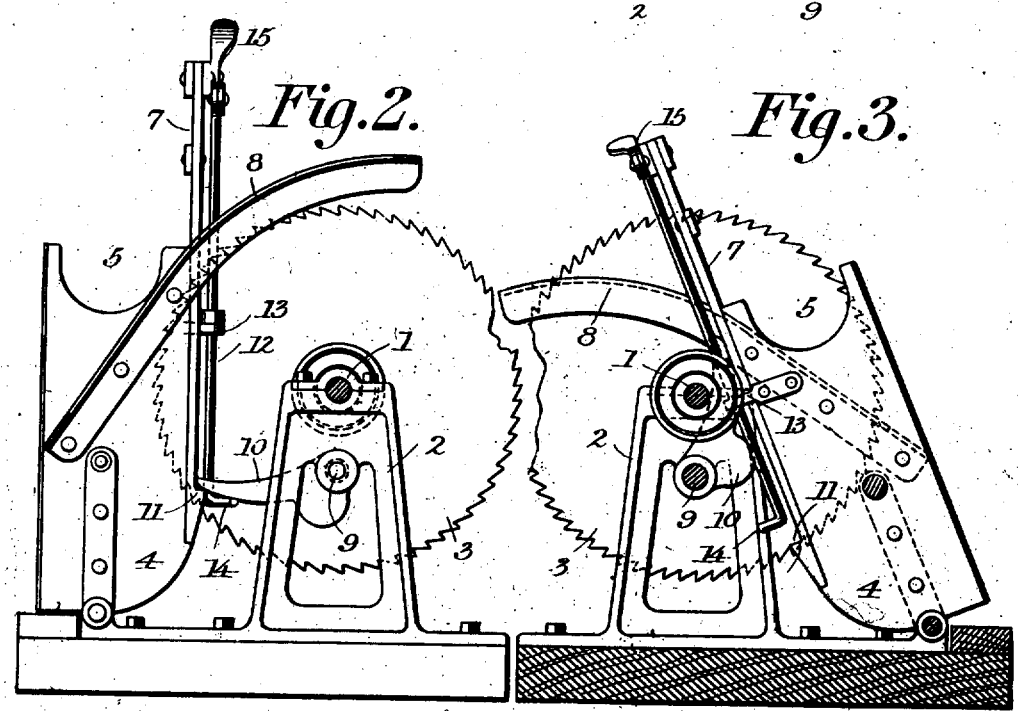

JOHN HOLMWOOD, OF DULUTH, MINNESOTA, ASSIGNOR OF ONE-HALF TO HARRY W. LANNERS, OF WEST DULUTH, MINNESOTA.

SAW-GUARD.

No. 899,300.     Specification of Letters Patent.     Patented Sept. 22, 1908.

Application filed February 4, 1908. Serial No. 414,184.

*To all whom it may concern:*

Be it known that I, JOHN HOLMWOOD, a citizen of the United States of America, residing at Duluth, in the county of St. Louis and State of Minnesota, have invented certain new and useful Improvements in Saw-Guards, of which the following is such a full, clear, and exact description as will enable others skilled in the art to which it appertains to make and use the same.

This invention relates to machines for cutting off the ends of laths and has for its object the provision of simple and efficient means whereby workmen or other persons in the immediate vicinity of the machine will be prevented from coming into contact with the saws.

With this object and such other incidental objects as will hereinafter appear in view, the invention consists in certain novel features of the apparatus illustrated in the accompanying drawings as will be hereinafter first fully described and then particularly pointed out in the claims.

In the drawings, Figure 1 is a plan view of a machine embodying the invention, the saw-guards being thrown forward. Fig. 2 is a vertical transverse section of the machine shown in Fig. 1 taken on the line 2 in said figure and Fig. 3 is a similar view taken on the line 3 of Fig. 1 with the saw-guards thrown rearward. Fig. 4 is a rear perspective view of one of the locking cams and the lever for releasing the same.

The saw arbor, 1, is mounted in suitable standards, 2, and is driven from any convenient source of power to rotate the saws, 3, all of these parts being of the usual or any preferred construction. The lath-buck is mounted to swing toward and from the saw-arbor and in the form shown consists of two standards, 4, having their lower ends pivotally secured to a suitable base or to the floor of the workroom and having their upper ends shaped to present notches, 5, in which the bundle of laths is held by the usual hook, in order that when the buck is thrown rearward the ends of the laths will be brought against the saws and the laths consequently cut to a uniform length. The standards are suitably braced and from their rear edges, a frame, 7, projects upward to furnish a handle by which the buck may be swung in the desired direction. On the outer sides of the standards are rigidly secured longitudinally slotted plates, 8, which project upward and rearward directly in front of and above the saws whereby the said plates constitute guards to prevent accidental contact with the saws. When the buck is thrown rearward, the saws will project through the slots in these guards so as to operate on the material to be cut but when the buck is thrown forward the guards will be in front of and beyond the teeth of the saws and will, therefore, ward off any object moving toward the saws.

By referring to Fig. 2, it will be seen that the guards are almost entirely in rear of the pivotal points of the standards. By reason of this arrangement, the buck may be moved rearward very easily when it is desired to use the saws and when thrown rearward will drop until supported by the driving shaft so that there will be no obstruction to prevent the saws cutting entirely through the bundle of laths as will be readily understood on reference to Fig. 3.

In order to hold the buck in its forward position when the saws are not being used, I provide a shaft, 9, which is journaled in the standards 2 and carries cams, 10, which are so shaped as to have an excess of weight between the said shaft and the buck whereby the cams will tend to constantly drop toward the buck so that when the buck is thrown forward to the limit of its movement the cams will be in a horizontal position and bear directly against the buck, as clearly shown in Fig. 2. In this position of the parts, a rearward movement of the buck will be prevented by the locking cams and in order that the cams may not drop below the horizontal position shoulders or stops, 11, are provided on the rear edges of the buck to receive and support the ends of the cams. As it is necessary to release the cams to permit the buck to be thrown rearward, a trip, 12, is provided consisting of a rod mounted in a bracket or ear, 13, on the buck and provided at its lower end with a spur, 14, projecting into the path of one of the cams, the upper end of the rod being pivotally attached to a lever, 15, which is mounted on the upwardly projecting handle portion of the buck. When the workman grasps the buck to swing it rearward, he depresses the free end of the lever 15 and thereby at once lifts the spur 14 so as to slightly raise the cams from their horizontal position and permit the buck to swing rearward, the continued rearward movement of the buck forcing the cams to swing upward, as will be readily understood upon reference to Figs. 2 and 3 of the drawings. When the work is finished, the buck is swung forward and the cams automatically drop into the locking position.

From the foregoing description, taken in connection with the accompanying drawings, it will be seen that I have provided a very simple arrangement by which the saws will be guarded but may be instantly exposed when they are to be used. When the buck is swung forward so that the cut laths may be easily removed, the guards are automatically locked above the saws and the locking mechanism is so disposed that it can not be accidentally released by a passer-by. When the machine is to be used, a single movement will carry the buck to the desired position and release the locking mechanism.

Having thus described my invention, what I claim and desire to secure by Letters-Patent is:—

1. The combination with a saw-guard and a vibratory support therefor, of a locking-cam bearing against the side of said support to hold the guard over the saw, and a trip mounted on the support and arranged to disengage the cam therefrom whereby the guard will expose the saw.

2. The combination with a saw-guard, and a vibratory support therefor, of a locking-cam mounted to bear against the rear side of said support, and a trip mounted on the support and provided with a spur engaging under the locking-cam.

3. The combination with a saw-guard, and a vibratory support therefor, of a locking-cam mounted to bear against the rear side of the support, a trip mounted on the support and provided at its lower end with a spur projecting under the locking-cam, and a lever fulcrumed on the support and pivotally connected with the upper end of the trip.

4. The combination of a saw-guard, and a vibratory support therefor having a shoulder on its rear side, a locking cam bearing against the support and adapted to rest at its end on said shoulder, a trip mounted on the support and provided with a spur engaging under said locking cam, and means for operating said trip.

In testimony whereof, I have signed this specification in the presence of two subscribing witnesses.

JOHN HOLMWOOD.

Witnesses:
 ROBERT C. WEDDELL,
 FRANK E. WATSON.